United States Patent Office 2,930,734
Patented Mar. 29, 1960

2,930,734

6-NITRO-2-DICHLOROACETYLAMINO BENZO-THIAZOLE AND THE USE IN COMBATTING BACTERIAL INFECTIONS

Sven Carlsson, Vällingby, Sweden, assignor to Aktiebolaget Recip, Stockholm, Sweden, a corporation of Sweden No Drawing. Application November 17, 1958
Serial No. 774,115

3 Claims. (Cl. 167—55)

This invention relates to a new and useful bacteriostatic and bactericidal substance, 6-nitro-2-dichloroacetylaminobenzothiazole, and to processes for its production. This new substance has been found to have a particularly strong bacteriostatic and bactericidal action and at the same time an extremely low toxicity to animals, including humans, and can be used as an antibacterial agent both in relatively concentrated and in a very diluted form. The new substance has an activity similar to that of known antibiotics obtained by the cultivation of micro-organisms and has a broad antibacterial spectrum which, however, does not comprise coli.

The new substance has proved to be particularly efficient against gram-positive bacteria, especially Streptococci, Staphylococci and Enterococci. Its activity against the two last-mentioned bacteria is of the same order as or in some cases somewhat stronger than that of the known antibiotic chloroamphenicol. On the other hand, the new substance has a special advantage viz, that its activity against gram-negative bacteria, e.g. the various coli species, is relatively low which fact reduces the risk of destroying the flora of coli bacteria necessary in the intestinal tract and which are destroyed to a high degree when administering the usual antibiotics, e.g. chloramphenicol.

In accordance with the present invention, there is provided a new substance, 6-nitro-2-dichloroacetylaminobenzothiazole, having the formula

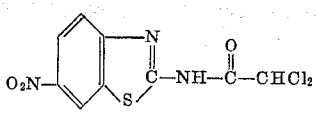

As apparent from this structural formula the new substance has some structural resemblance to chloroamphenicol in so far as it also contains a nitro-substituted phenyl radical and an amino group substituted by a dichloroacetyl radical. This resemblance, however, is not so great that the bacteriostatic and bactericidal effects of the new substance could have been predicted in any way. It should be noted that chloroamphenicol, i.e. d-threo-1-p-nitrophenyl-2-dichloroacetoaminopropanol-1,3 has its nitro-phenyl radical as well as its 2-dichloroacetyl-amino group attached to an aliphatic chain, and does not contain any heterocyclic ring. In the new substance according to the invention, on the other hand, those substituents are not attached to an aliphatic radical but the dichloracetylamino group is attached to the substitutable carbon atoms in the heterocyclic ring of the benzothiazole and the phenyl group forms together with the heterocyclic ring the benzothiazole thus forming a condensed aromatic heterocyclic ring system. The constitution of the new substance, therefore, in very important respects deviates from that of the known antibiotic chloroamphenicol.

The new substance can be used for therapeutic purposes either alone or together with a physiologically acceptable carrier or diluent. The new substance may be administered by the oral route, for example in the form of capsules, tablets, syrups, emulsions, aqueous suspensions, elixirs and other similar pharmaceutical preparations. Preferred methods of oral administration of the new substance include administering it in the form of hard-filled gelatin capsules containing an inert-filler such as lactose or milk sugar, or as tablets containing excipients such as starch, magnesium stearate, sodium citrate, polyvinylpyrrolidone, polyethylene glycol, etc.; the new substance may also be administered as an aqueous suspension, syrup, emulsion or elixir in a carrier containing a suitable sweetening and/or flavoring agent and, if desired, also a coloring agent, e.g. cherry-red colored raspberry flavored syrups.

The usual dosage for administration to humans will be determined by the physician but ordinarily is in the range of about 50-2000 mg. per day and preferably in about one to about four doses. However, this dosage may vary somewhat with the weight of the subject being treated and about 1-20 mg. per kg. of body weight per day is usually employed.

The new substance may also be used in the form of an ointment or as a powder for percutaneous application and prepared in the usual manner using ordinary ointment bases and diluents.

The activity of the new substance has been compared with that of chloroamphenicol by means of a test which was carried out by using a method based on the investigations of G. L. A. Ruehle and C. M. Brewer, Circular No. 198 (December 1931), United States Department of Agriculture, Washington, D.C., and N. Diding and P. Hedlund, Svenska Läkartidningen, vol. 49 (1952), pp. 2171-2181.

These tests have shown that the new substance has about the same order of activity as chloramphenicol against *Bacillus cereus*, Staphylococci, Enterococci and Streptococci but a very low activity against coli. The new substance gives a fairly good protection against typhus, *Shiga sonnei* and *A. aerogenes*.

The chronic toxicity of the new substance has been investigated on rabbits. The substance was administered orally in the form of gelatin capsules in a dosage of 5, 50 and 100 mg./kg. body weight each day for about 6 weeks. No animal showed any toxic symptoms and one of the animals brought forth young rabbits during the test period. The number of red and colourless blood-corpuscles was unaltered during the test period and the weight curve did not show any abnormality. In the pathological-anatomical investigation of the test animals no significant pathological changes were observed.

The toxicity determinations thus showed that the new substance has an extremely low or possibly no toxicity at all which fact of course is very unique and makes the substance especially useful in cases where the toxicity of other chemotherapeutics makes them dangerous to use in the required dosages.

The present invention also relates to a method for the preparation of the new substance which comprises reacting 6-nitro-2-aminobenzothiazole with a dichloroacetylating agent, that is an agent capable of introducing a dichloroacetyl group into the amino group of 6-nitro-2-aminobenzothiazole, especially agents of the group comprising dichloroacetic acid or a reactive derivative thereof, for instance the anhydride, an ester, e.g. a lower alkyl ester containing from 1 to 6 carbon atoms in the alkyl chain, e.g. the methyl ester, or a halide, e.g. the chloride, of the said acid, and finally recovering the 6-nitro-2-dichloroacetylaminobenzothiazole formed.

The reaction may be carried out in an excess of the dichloroacetylating agent, such as dichloroacetyl chloride, or in a solvent or a suspending agent for the starting materials, such as aliphatic and aromatic hydrocarbons, ethers, and dialkyl amides of organic acids, such as dimethyl formamide. In view of the reactivity of the dichloroacetylating agent it is usually advisable to avoid the use of solvents that might react with the said agent, such as water or alcohols.

The reaction may be carried out at any temperature between room temperature and the boiling point of the reaction medium, such as between 20 and 180° C. but it should be noted that the temperature is not critical in any way, higher temperature giving a higher reaction rate. However, as the reaction is exothermic it might be suitable to add the dichloroacetylating agent gradually or to carry out the reaction under reflux.

The reaction may also be carried out in the presence of acid-binding agents, preferably of such a nature, that they cannot react with dichloroacetylating agent. Therefore, if an organic base is used as the acid-binding agent it is preferable to use a base that does not contain any reactive hydrogen atom, such as pyridine. Pyridine may also be used as a solvent for the reactants.

The reaction period depends upon the reaction temperature used and usually is of the order of 1 to 60 minutes. When the reaction is completed there is added to the warm reaction mixture, if desired cooled somewhat, an absolute alcohol, such as absolute ethanol, and the mixture is cooled to precipitate the formed 6-nitro-2-dichloroacetylaminobenzothiazole, which might be recovered by filtration, centrifugation or the like. The product obtained might be recrystallised from any suitable solvent, such as dimethyl ethyl ketone.

As a starting material there is preferably used 6-nitro-2-aminobenzothiazole which is a known compound described in Archiv der Pharmazie, 273, p. 48, 1935.

The new substance has the following physical properties:

When recrystallized from methyl ethyl ketone containing 15% water of the weight of the substance crystals containing two mols of water are obtained. After drying these crystals at 105° C. the waterfree product melts at 210–212° C. in capillary tubes and at 208–210° C. in the Kofler block. The substance is light yellow, difficultly soluble in water, better soluble in ethanol and methyl ethyl ketone and easily soluble in polyethylene glycol 200. The substance has an absorption maximum at 326 mμ and an absorption minimum at 270 mμ, measured in 95% ethanol having a pH below 4.7.

The invention is further illustrated by the following non-limiting example which shows the preferred embodiment applied for the production of the new substance.

*Example.*—50 grams of 6-nitro-2-aminobenzothiazole were suspended in 100 grams of dimethyl formamide, and then 50 grams of dichloroacetyl chloride were added portionwise. By the reaction heat thus generated the temperature of the mixture rose to about 90° C. and a limpid solution was formed. When the solution had become somewhat cooler 50 mls. of absolute ethanol are added and the mixture was cooled. There was thus formed a precipitate of 6-nitro-2-dichloroacetylamino benzothiazole which was recovered by filtration and recrystallized from dimethyl ethyl ketone. Melting point of the dry substance: 210–212° C.; yield: 45 g.

The present invention is not limited to the above-described method, as it is also possible to start from 2-aminobenzothiazole, in which case this compound is at first reacted with a dichloroacetylating agent or with the acid itself whereupon the resultant 2-dichloroacetylaminobenzothiazole is nitrated. This nitration may also produce in addition to the desired 6-nitro-2-dichloroacetylaminobenzothiazole isomeric products having their nitro groups attached in other positions of the benzene nucleus. However, the 6-nitro compound can readily be separated from the said isomers in accordance with ordinary methods, such as by fractional crystallization.

What I claim is:

1. As a new compound 6-nitro-2-dichloroacetylaminobenzothiazole having the formula

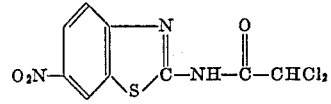

2. A method of combatting bacterial infections in humans and animals, said method comprising orally administering 6-nitro-2-dichloro acetylamino benzothiazole in a daily dose between about 1 mg. and about 20 mg. per kg. of body weight.

3. A method of combatting bacterial infections in humans and animals, said method comprising percutaneously administering 6-nitro-2-dichloro acetylamino benzothiazole in a daily dose between about 1 mg. and about 20 mg. per kg. of body weight.

References Cited in the file of this patent

Hunter et al.: Chem. Abstracts, vol. 25, p. 104 (1931).